(12) United States Patent
Biruduganti et al.

(10) Patent No.: US 7,455,046 B2
(45) Date of Patent: Nov. 25, 2008

(54) NITROGEN ENRICHED COMBUSTION OF A NATURAL GAS INTERNAL COMBUSTION ENGINE TO REDUCE $NO_X$ EMISSIONS

(75) Inventors: Munidhar S. Biruduganti, Naperville, IL (US); Sreenath Borra Gupta, Naperville, IL (US); R. Raj Sekar, Naperville, IL (US); Steven S. McConnell, Shorewood, IL (US)

(73) Assignee: U Chicago Argonne LLC, Chicago, IL (US)

( * ) Notice: Subject to any disclaimer, the term of this patent is extended or adjusted under 35 U.S.C. 154(b) by 0 days.

(21) Appl. No.: 11/450,619

(22) Filed: Jun. 9, 2006

(65) Prior Publication Data

US 2007/0044760 A1 Mar. 1, 2007

Related U.S. Application Data

(60) Provisional application No. 60/712,543, filed on Aug. 30, 2005.

(51) Int. Cl.
*F02P 5/00* (2006.01)
*F02B 43/00* (2006.01)

(52) U.S. Cl. .................. 123/406.45; 123/527

(58) Field of Classification Search ............ 123/406.45, 123/527, 585
See application file for complete search history.

(56) References Cited

U.S. PATENT DOCUMENTS

| 4,306,526 | A | * | 12/1981 | Schaub et al. ............... 123/257 |
| 5,260,043 | A | * | 11/1993 | Li et al. ................... 423/239.2 |
| 5,649,517 | A | | 7/1997 | Poola et al. |
| 6,055,808 | A | | 5/2000 | Poola et al. |
| 6,122,909 | A | * | 9/2000 | Murphy et al. ................ 60/286 |
| 6,523,349 | B2 | * | 2/2003 | Viteri ........................... 60/716 |
| 6,742,507 | B2 | * | 6/2004 | Keefer et al. ................ 123/585 |
| 6,868,677 | B2 | * | 3/2005 | Viteri et al. ................... 60/784 |
| 7,011,796 | B2 | * | 3/2006 | Raybone et al. ......... 422/186.04 |
| 2002/0104518 | A1 | * | 8/2002 | Keefer et al. ................ 123/585 |
| 2005/0229900 | A1 | * | 10/2005 | Weber et al. ................. 123/316 |

FOREIGN PATENT DOCUMENTS

| WO | WO 99/67508 | 12/1999 |
| WO | WO 00/31386 | 6/2000 |

* cited by examiner

*Primary Examiner*—John T Kwon
(74) *Attorney, Agent, or Firm*—Foley & Lardner LLP (57) ABSTRACT

A method and system for reducing nitrous oxide emissions from an internal combustion engine. An input gas stream of natural gas includes a nitrogen gas enrichment which reduces nitrous oxide emissions. In addition ignition timing for gas combustion is advanced to improve FCE while maintaining lower nitrous oxide emissions.

20 Claims, 8 Drawing Sheets

NITROGEN ENRICHED COMBUSTION OF A NATURAL GAS INTERNAL COMBUSTION ENGINE TO REDUCE $NO_x$ EMISSIONS

CROSS-REFERENCE TO RELATED PATENT APPLICATIONS

This application claims the benefit under 35 USC 119(e) of U.S. Application 60/712,543, filed Aug. 30, 2005, incorporated herein by reference in its entirety.

GOVERNMENT INTEREST

The United States Government has certain rights in the invention pursuant to Contract No. W-31-109-ENG-38 between the U.S. Department of Energy and the University of Chicago operating Argonne National Laboratory.

The present invention is related generally to reduction of nitrous oxide ($NO_x$) emissions from internal combustion engines. More particularly the invention is related to reduction of $NO_x$ emissions from natural gas powered internal combustion engines.

BACKGROUND OF THE INVENTION

Stationary natural gas engines are currently used for a variety of industrial applications, such as for electrical power generation and for oil-field pumping applications. These large-bore engines, up to 20 cylinders and up to 20 MW in capacity, are typically operated around the clock. While overall efficiency and reliability are of primary importance, $NO_x$ emissions are becoming a major concern with impending stricter EPA and state emissions regulations and laws. To overcome this problem, some manufacturers have resorted to lean burn combustion or exhaust gas recirculation (EGR). Lean burn natural gas engines operate with a higher than average air-fuel ratio of 22:1 rather that 17:1 which is normal. The advantage is that lean burn engines operate at a lower combustion temperature which is a major parameter for reducing $NO_x$ compared to stoichiometric or rich burn engines. Lean burn operation also decreases specific fuel consumption and pollutant emissions, including CO emissions. However, the drawbacks include the loss of specific power and misfire at very lean operating conditions which result in high hydrocarbon (HC) emissions. NOx reduction using EGR is also not usually a desirable solution because it degrades engine reliability and increases maintenance.

Nitrogen injection into intake air for $NO_x$ reduction in diesel engines is generally known in the industry and has been the subject of research efforts (see, for example, U.S. Pat. No. 5,649,517, U.S. Pat. No. 6,055,808, WO 00031386A1, and WO 09967508A1). In a diesel engine, liquid fuel is sprayed into the combustion chamber after the piston compresses intake air to very high pressures and temperatures. When the fuel is injected into the combustion chamber at a desired injection timing, the fuel vaporizes and a flame front develops on the outer periphery of the spray where the local equivalence ratio close to 1.0 is established. However this diffusion limited flame front moves to the remainder of the cylinder rather quickly as the ensuing fuel from the injector vaporizes and mixes with the in-cylinder air charge.

In a spark ignited (SI) natural gas engine, a spark is generated after the incoming natural gas-air homogenous mixture is compressed significantly. A flame front develops around the spark and progressively moves outward burning the remainder of the mixture. The speed of the flame front is determined by mixture properties, such as, pressure, temperature and excess air ratio ($\lambda$). Consequently, there are important differences between diesel engines and natural gas engines which require a different approach than in conventional diesel engine practices.

As mentioned above, current industry practice for natural gas, SI low-$NO_x$ engines is to operate the engine with high excess air, or relatively lean. This reduces the $NO_x$, but at the expense of lowered power production and increased HC emissions. This effect is due to the quenching that high excess air provides in the homogenous charged engine. In contrast to what has been previously proposed, introducing additional diluent (such as $N_2$) into a low-$NO_x$, lean burn natural gas engine aggravates the quenching that is already occurring with the result that unacceptable HC emissions, fuel efficiency, and potentially, misfire may occur.

Similarly, diesel engines operate with high excess air. Unlike the homogenously charged natural gas engine, the area in which the combustion reactions occur is relatively small as discussed above, allowing additional diluent to be introduced with significant $NO_x$ reduction effect, but at the price of fuel efficiency. Also, additional diluent ($N_2$, for example) must be introduced in relatively large quantities given the high degree of excess air in the diesel engine.

Tests confirm the above reasoning, with a small 2% nitrogen enrichment to the intake air of a stoic-burn natural gas engine lowered $NO_x$ production by approximately 70%. Similarly, in the case of a diesel engine 2% enrichment lowered $NO_x$ by 60%; however, the associated fuel penalty was significant, as high as 5%.

Some of the additional combustion concepts currently studied are Homogeneous Charge Compression Ignition (HCCI), pilot ignited natural gas engines, and the previously described spark-ignited natural gas engines. Each group has its advantages and limitations. HCCI engines are limited by poor ignition and combustion control at high loads while promising relatively low emissions. Pilot ignited natural gas engines utilize a pilot fuel, usually diesel, to initiate combustion. These engines take advantage of the high compression ratios of compression ignition (CI) engines and hence attain fairly higher fuel conversion efficiencies. However, these engines need a major hardware change (and thus large capital investment) for their functionality, and thus these modalities suffer from substantial disadvantages as well.

SUMMARY OF THE INVENTION

Rather than operate a natural gas engine in any of the above-recited problematic modes, this invention presents an advantageous combination of operating parameters. Specifically, in a most preferred embodiment this invention involves operating a natural gas engine in near-stoichiometric ("stoic") mode, with the introduction of a modest (50% lower than the diesel requirements) amount of $N_2$ diluent into the engine, and/or, a revised ignition timing strategy, part or all of which result in an optimal combination of specific power, fuel economy, reduced hydrocarbon (HC) and $NO_x$ emissions. Additionally, this combination requires substantially lower $N_2$ quantities which reduces associated equipment size and improved economics. The result is that the $NO_x$ reduction is more pronounced in the stoic-burn engine approach ($\lambda=1.0$) where (lambda $\lambda$ is defined as the ratio of actual air to fuel ratio and stoichiometric air to fuel ratio), rather than the lean-burn engines ($\lambda \geq 1.42$). In stoic-burn natural gas engines the air flow rate required per kW output is 4 to 5 times less than a similar value for a typical diesel. This particular factor makes the use of air separation membranes for stoic-burn natural gas engines very attractive and practical. More importantly, $NO_x$ can be lowered by 70% with a combination of ignition advance and 2% nitrogen enrichment—a value that can be easily achieved using conventional air separation membranes very effectively. Air separation membranes selectively permeate $O_2$ through thousands of fibers coated with a polymeric material hence producing $O_2$-rich and $N_2$-rich streams.

The effect of spark or ignition timing along with nitrogen enrichment is also important; and advancing the ignition timing from conventional values has more advantages than retarding the same. A 68% reduction in $NO_x$ and a 0.8% drop in fuel conversion efficiency (FCE) were observed at −30 ATDC ignition timing. However, the maximum ignition timing advance with stable engine operation was limited to −40 ATDC to avoid engine misfire at higher concentrations of nitrogen-rich air and poor FCE from overly retarded spark timing.

Various aspects, features and advantages of the invention are described hereinafter, and these and other improvements will be described in more detail below, including the drawings as described in the following section.

DETAILED DESCRIPTION OF THE PREFERRED EMBODIMENTS

Investigation of alternative fuels and methods of operation is essential in view of the increasingly stringent emissions regulations and laws, the depleting fuel resources and the need for freedom from fuel dependence on foreign countries. In accordance with the preferred form of the invention, nitrogen enrichment using an air separation membrane is an advantageous strategy for $NO_x$ reduction because engine reliability, unlike EGR, is not compromised. Oxygen-rich and nitrogen-rich streams are produced by passing air through a nonporous polymeric membrane. Nitrogen enriched air reduces in-cylinder combustion temperatures which reduces $NO_x$ formation. Implementation of this strategy and optimizing the operating conditions for the engine configuration will simultaneously reduce emissions and improve performance.

The preferred embodiment of the invention involves a combination of controlling nitrogen enriched air along with modifying the spark or ignition timing to improve engine performance and emissions. An experimental system 10 illustrated in FIG. 1 was used to prove out the general concept of the invention. The system 10 includes a gas generator engine 12 such as a single cylinder Kohler natural gas generator 6000 Pro operating at 2700 rpm. In establishing this combination of features, the single cylinder Kohler natural gas generator engine 12 was used to investigate nitrogen-enriched combustion and the effect of ignition timing on its performance and emissions characteristics. The system 10 details are included in Table 1.

Figure 1:
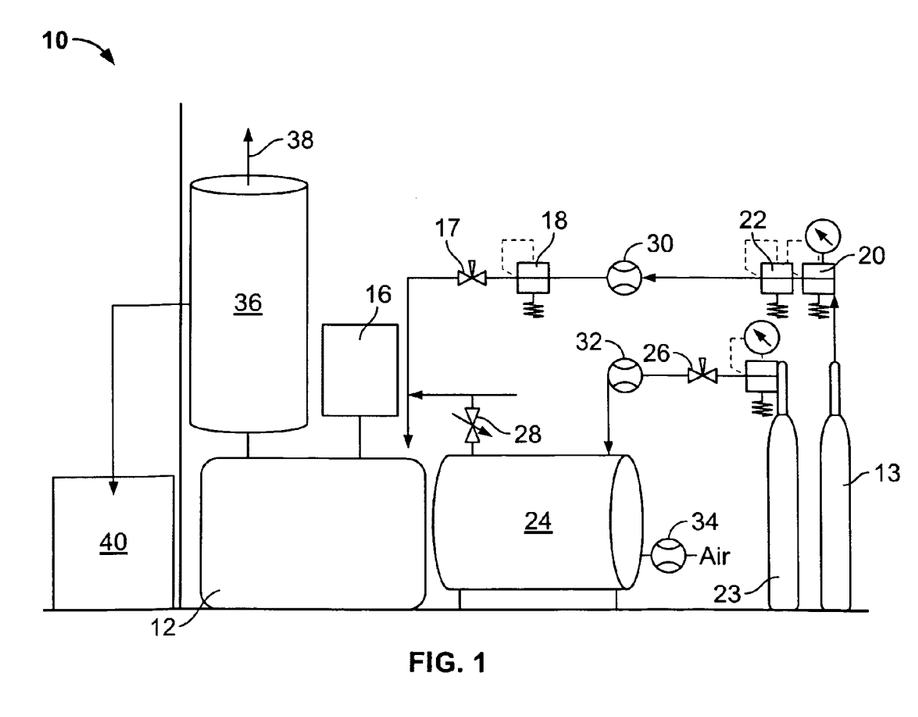
FIG. 1 illustrates a schematic of a test system for illustrating the method and system of the invention.

A natural gas conversion kit (Type 3 for Kohler M12 generator) supplied by US Carburetion Inc was installed to operate the system generator engine 12 with natural gas from tank 13. The kit consists of a regulator 17 and a load block 18. The regulator supplies fuel according to the demand of the generator engine 12 via the load block which in turn controls the amount of gas flow into the generator 12. The vacuum line from the carburetor to the natural gas regulator triggers the gas flow.

TABLE 1

| Engine Details | |
| --- | --- |
| Generator | 6 MM |
| Wattage, 60 Hz | 4000 |
| Voltage-60 Hz | 120, 120/240 |
| Amperage-60 Hz | 50, 41.7/20.8 |
| Engine | Single Cylinder, 4 Stroke, SI, Air cooled |
| Bore/Stroke (mm) | 85.85/82.55 |
| Comp. Ratio | 6.6:1 |
| Displacement (cc) | 476.5 |
| Horsepower | 12 |
| RPM-60 Hz | 3600 (rated), 2700 (operated) |
| Ignition System | Module controlled/Electronic |

Compressed methane (98%) at 2500 psig was used with two-stage regulation to acquire the required intake pressure of the natural gas regulator. The primary regulator 20 steps down the gas pressure to about 15 psig while the secondary regulator 22 further reduces the pressure to 10-14 inches of water which is a requirement for the natural gas regulator 18. The secondary regulator 22 can handle a maximum pressure of 250 psig and hence the outlet pressure from the primary regulator 20 was below the maximum limit. $N_2$ from tank 23 was regulated to a pressure between 15-40 psig and introduced into an intake air tank 24. It was controlled by a needle valve 26 as shown in FIG. 1 to achieve the desired flow rate. Methane was introduced into the intake manifold downstream of the intake air tank 24 where it was fumigated with air and $N_2$ via valves 26 and 28 before entering the generator engine 12. Sierra mass flow meters 30, 32 and 34 were used to measure the flow rates of methane, nitrogen and air. Exhaust gases were processed through exhaust surge tank 36 with venting stream 38 and other processed material input to a Pierbrug emission bench 40.

The load on the generator engine 12 was applied using the 10 kW Simplex load bank 16. It has a number of resistors rated at 500, 1000, and 2000 watts. Using toggle switches, a combination of different resistors can be coupled to apply the required load. High speed in-cylinder pressure was measured using a Kistler 6013B pressure transducer which was plugged into a specially drilled hole in the cylinder head. The pressure signal was phased with respect to crank angle using an optical shaft encoder (BEI), which was coupled to the engine crankshaft. The transducer was connected to a data acquisition system (Win600) to do combustion analysis via charge amplifier (Kistler) which converts the charge signal to a voltage signal. A new CD200 ignition module supplied by Altronic, Inc., was mounted on the test stand to vary ignition timing with respect to top dead center (TDC) of the generator engine 12. The maximum operating range was 48 Crank Angle Degrees (CAD).

Engine-out emissions were measured using an integrated assembly of analyzers (Pierburg 2000 emissions bench) controlled by a computer (not shown). Hydrocarbons were measured using a heated flame ionization detector (HFID) while a chemiluminescent detector was used for $NO_x$ measurement. Oxygen concentration was measured with a paramagnetic analyzer and CO and $CO_2$ were measured using infrared analyzers.

The test matrix consisted of three phases, namely:
$N_2$ enrichment
Variation of spark or ignition timing
Combination of $N_2$ enrichment and ignition timing $N_2$ enrichment was obtained by mixing nitrogen and air in the intake manifold upstream of the intake air tank 24. The intake air temperature and pressure was not conditioned or altered. The ignition timing in Phase I was fixed at −20 after top dead center (ATDC). The rated engine speed (3600 rpm) was reduced to 3000 rpm by changing the sensitivity of the governor in order to avoid harsh operating conditions. Further, engine speed dropped considerably for a combination of different load, ignition timing and $N_2$ enrichment conditions. Load was applied by a combination of different resistors using toggle switches. Accurate load measurement was beyond the scope of this experiment, and hence the applied load was assumed to remain constant for every test condition despite the decrease in engine speed. It is believed, however, that the actual load could vary depending on the test conditions. The rated load of the generator engine 12, before conversion to operate with natural gas, was 5 kW. However, with natural gas fueling the engine of the generator engine 12 could not produce the rated power efficiently and hence full load was modified to 4 kW. Most of the discussion and analysis was done with respect to a full load (4 kW).

Figure 2A:
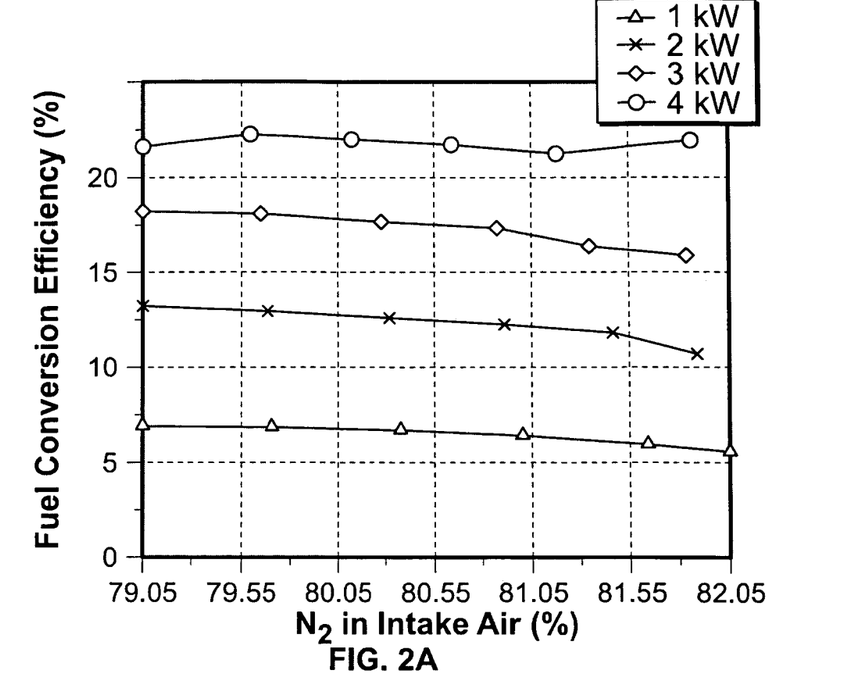
FIG. 2A illustrates the effect of $N_2$ enrichment on FCE and FIG. 2B illustrates the effect on engine speed.
Figure 2B:
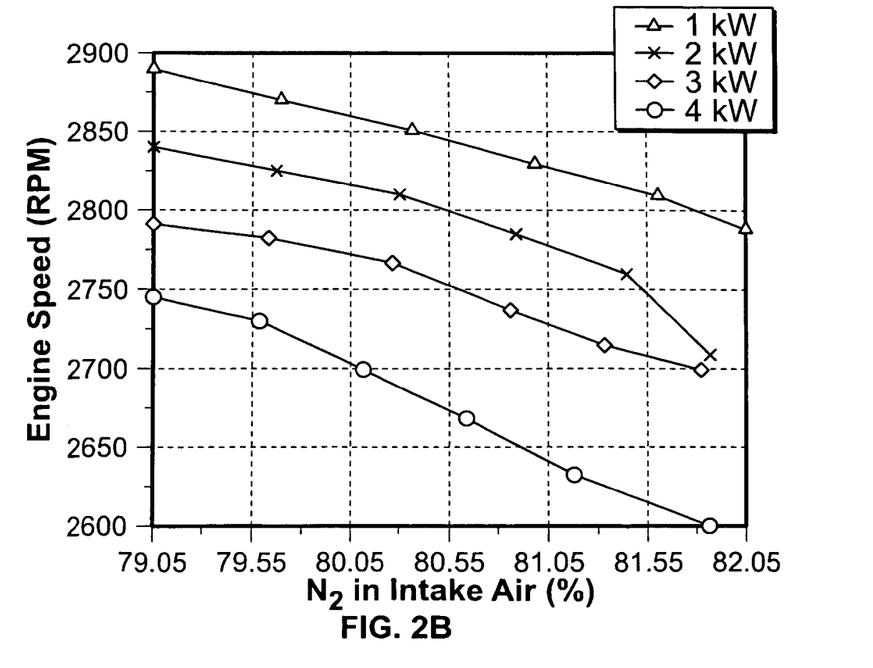
Figure 3A:
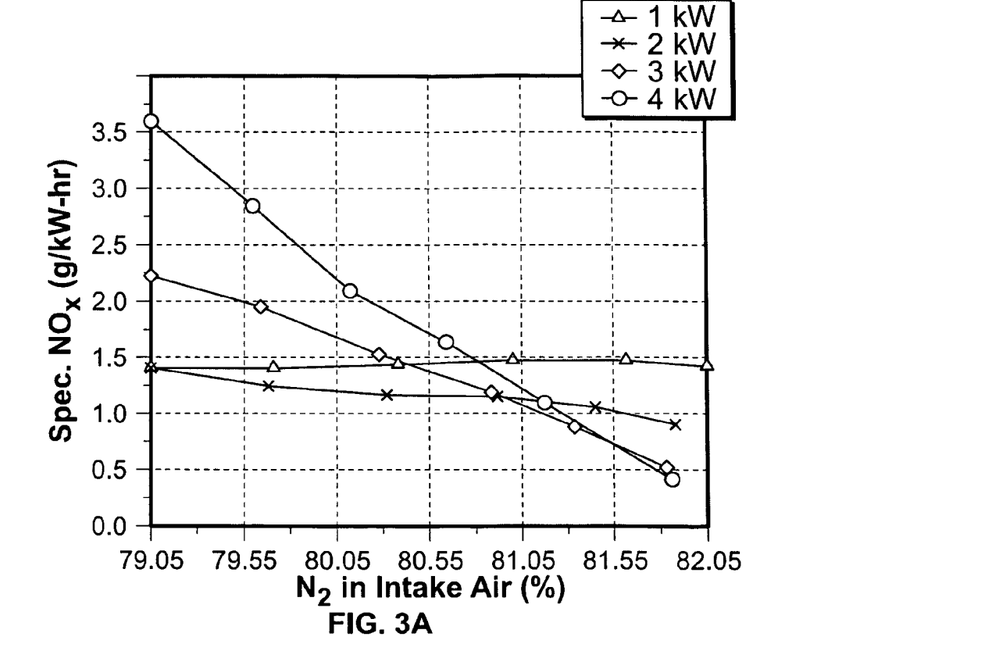
FIG. 3A illustrates effect of $N_2$ enrichment on specific $NO_x$ production and FIG. 3B illustrates the effect of specific HC production.
Figure 3B:
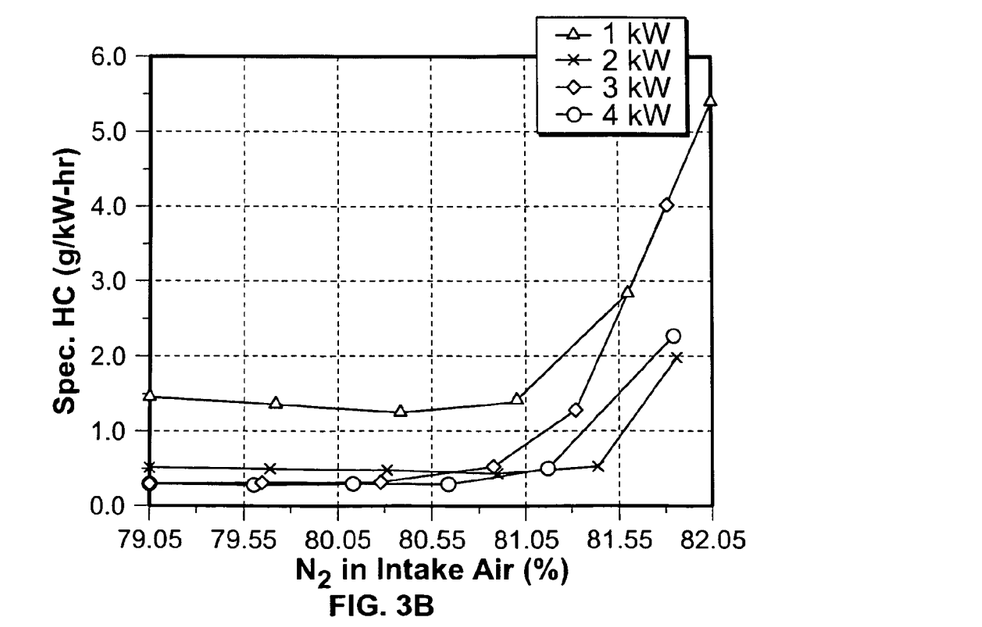

FIGS. 2A and 2B show fuel conversion efficiency (FCE) and engine speed as a function of $N_2$ enrichment for different loading conditions. FCE is defined as the ratio of the applied load to the fuel energy feed rate based on the lower heating values of natural gas. The FCE curves for all loads exhibit a decreasing trend with $N_2$ enrichment. $N_2$ enrichment was attained by controlling the $N_2$ flow rate from 0 to 50 slpm (standard liters per minute) with 10 slpm increments. However, acceptable engine operation was limited to 40 slpm of $N_2$. The equivalence ratio ($\Phi$) defined as the ratio of actual fuel/air to stoichiometric fuel/air mass flow rates varied from 0.9 to 0.85 with $N_2$ enrichment. The engine generated FCE values of 7, 13, 18, and 22 percent for the corresponding loading conditions of 1, 2, 3, and 4 kW. The ignition timing for FIGS. 2A, 2B, 3A, 3B and 4A-4C was fixed at −20 ATDC. Engine speed decreased with $N_2$ enrichment for all loads. This behavior is due to combustion inefficiency or lack of sufficient $O_2$ for complete combustion of the fuel. Also, the drop in engine speed with $N_2$ enrichment suggests that FCE trends would decrease far more than displayed in FIGS. 2A and 2B.

On the other hand, $NO_x$ reduction (FIGS. 3A and 3B) for higher loads was very aggressive which amounts to 88% for 50 slpm $N_2$ flow rate, which is equivalent to 81.8% of $N_2$ in intake air and 70% for 40 slpm $N_2$ flow rate, which is equivalent to 81.16% of the same. $N_2$ enrichment was limited to 50 slpm at full load (4 kW) due to engine misfire and poor operating conditions which explains the abnormal rise in FCE at that point. It was observed that $N_2$ enrichment (0-50 slpm) had moderate (35% reduction at 2 kW) or no effect (1 kW) on $NO_x$ reduction at lower load conditions. However, unburned hydrocarbons increased significantly at low loads and for higher nitrogen enrichment conditions. At low load (1 kW), the unburned hydrocarbons were higher compared to other loading conditions due to combustion inefficiency and poor throttle control.

Figure 4A:
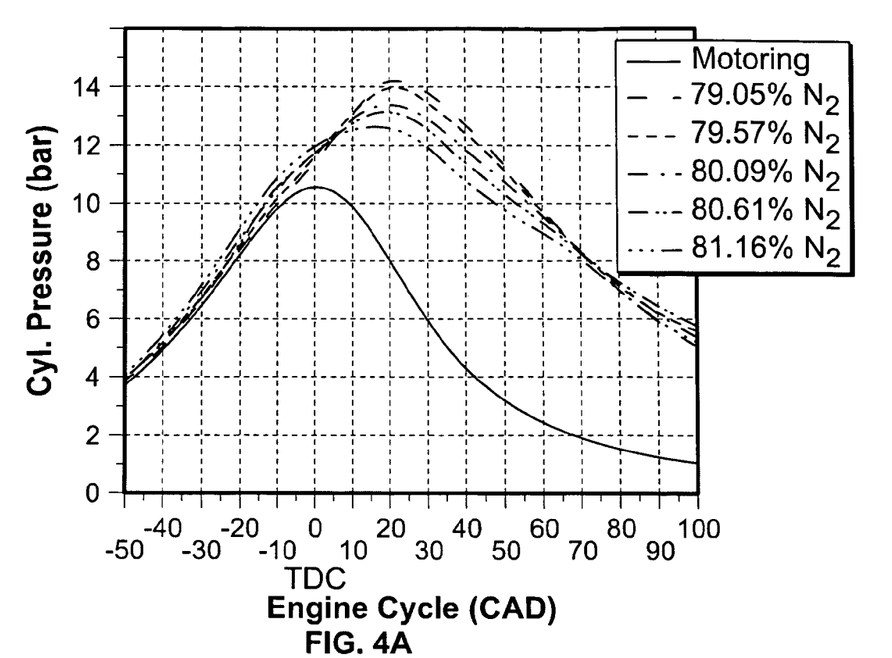
FIG. 4A illustrates cylinder pressure versus engine cycle for different $N_2$ enrichment conditions.
Figure 4B:
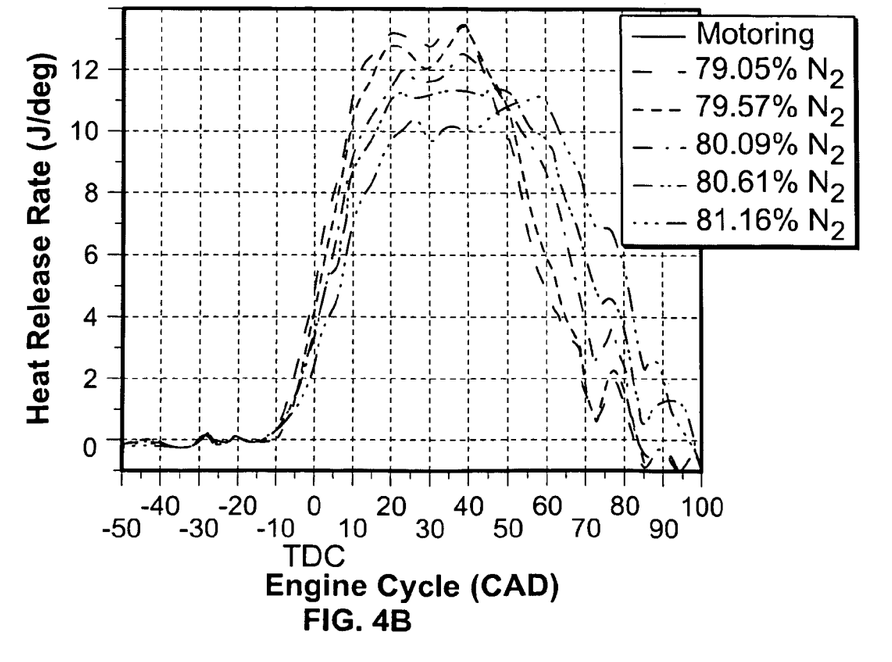
FIG. 4B illustrates heat release rate and FIG. 4C illustrates mass fraction burn.
Figure 4C:
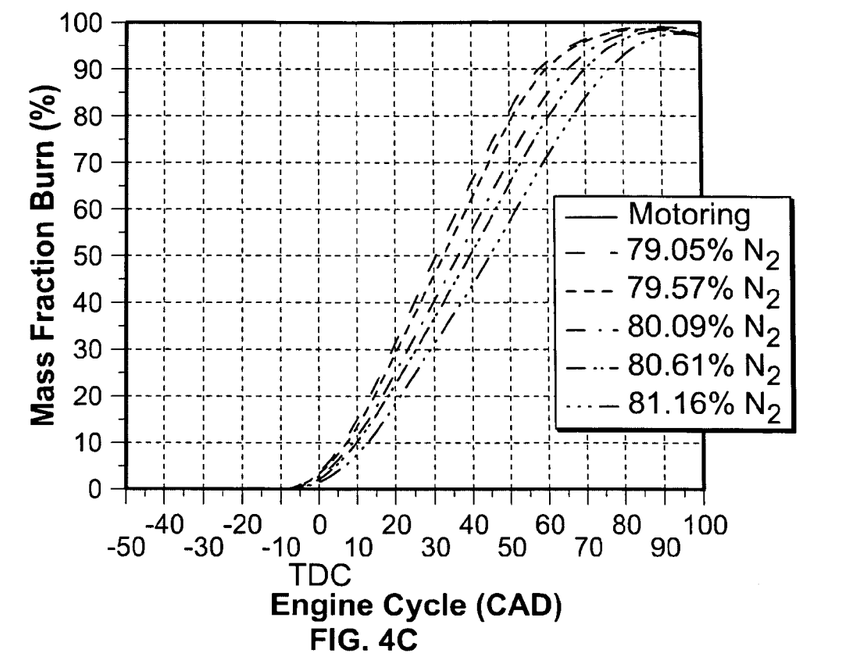

FIGS. 4A-4C display the cylinder pressure, rate of heat release, and the mass fraction burn trends for different $N_2$ enrichment conditions at full load (4 kW) and −20 ATDC and ignition timing (IT). Cylinder pressure was averaged over 100 consecutive engine cycles for combustion analysis. Clearly, the peak pressures decrease with $N_2$ enrichment resulting in lower bulk gas in-cylinder temperatures, which explains the reduction in $NO_x$ emissions, FCE and engine speed. Although the phasing of the peak pressure relative to TDC decreases with $N_2$ enrichment, the greater drop in peak pressure results in lower FCE. Both the heat release rates and the mass fraction burn rates decrease with $N_2$ enrichment. The phasing of the heat release curves is shifted (away from TDC) more into the expansion stroke of the engine cycle which leads to a loss in engine power and FCE. Mass fraction burn (MFB) is defined as the instantaneous burned mass normalized by the total mass of charge in the cylinder.

$N_2$ enrichment delays the 10% burn rate considerably which is often referred to as the flame development angle or sometimes "Ignition Delay." The difference in the crank angle of MFB at the extreme conditions (79.05% and 81.16% of $N_2$ in intake air) increases from 6.5 CAD at 10% to 20 CAD at 90%. This behavior implies that $N_2$ enrichment results in lower burning rates and longer combustion duration. The lower burning rates are attributed to the slower flame development and propagation speeds caused by $N_2$ enriched air. Therefore, it was understood that the lower heat release rates, longer combustion duration, and the shift of the phasing of heat release rates contribute to the drop in FCE and $NO_x$ emissions.

Figure 5A:
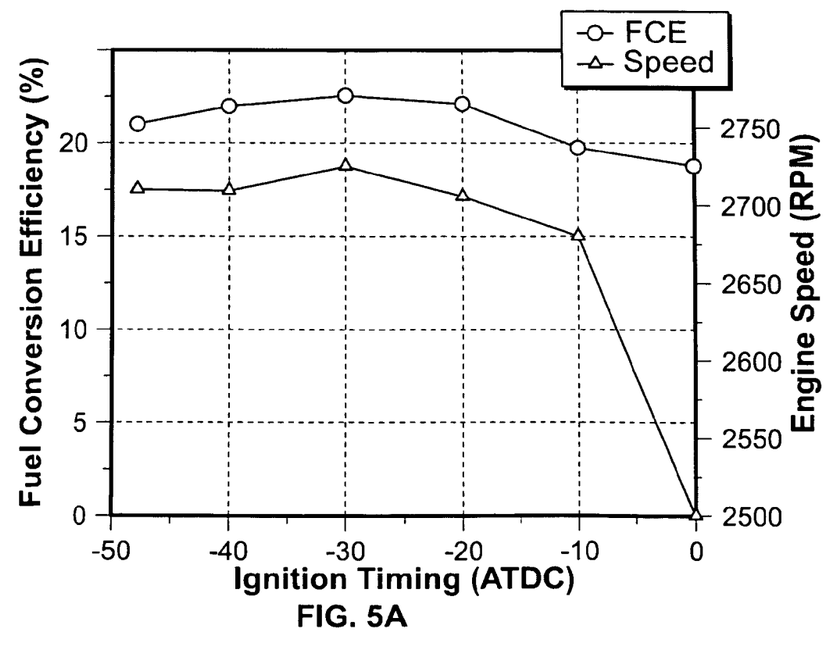
FIG. 5A illustrates effect of ignition timing on FCE and FIG. 5B illustrates effect of ignition timing on $NO_x$ and HC production.
Figure 5B:
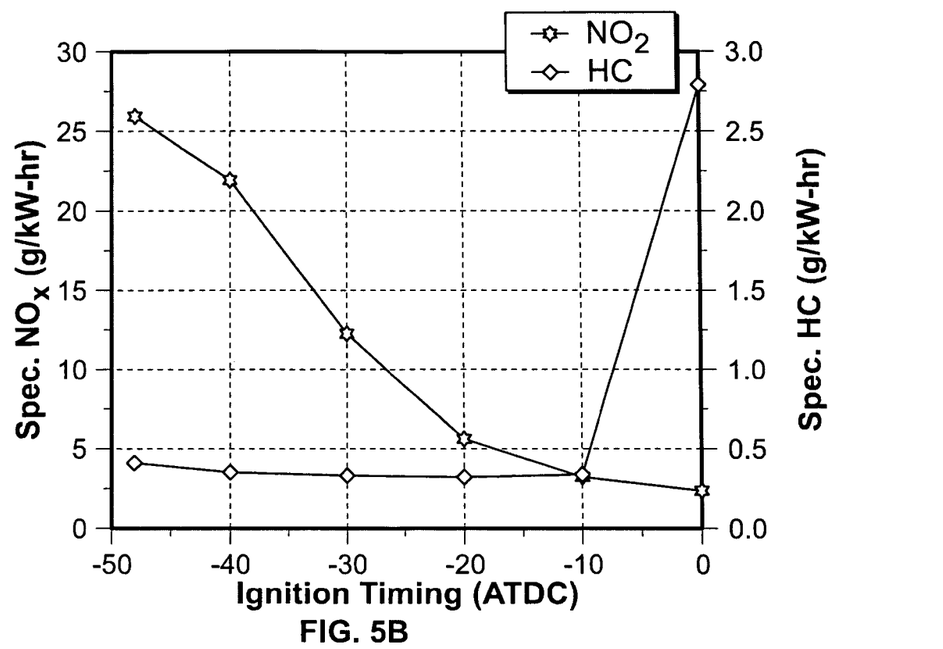

Ignition or spark timing is an important variable in optimizing engine performance. Conventional $NO_x$ reduction strategies in internal combustion engines utilize retarded ignition timings with a penalty in FCE. Ignition timing (IT) was fixed at −20 ATDC in the previous discussion. The preferred operating range of the ignition system is set forth herein and highlights the effect of ignition timing on engine performance. FIGS. 5A and 5B show FCE, engine speed, and specific emissions as a function of ignition timing for full load condition with no $N_2$ enrichment. The timing sweep ranged from TDC to −48 ATDC (maximum range of the ignition system). Clearly, FCE and engine speed increased from 0 to −30 ATDC, but decreased by further advancing the ignition timing.

$NO_x$ emissions increased consistently with advanced ignition timings. Unburned hydrocarbons, on the other hand, were the maximum at TDC timing due to engine misfire and poor ignitability conditions and decreased considerably with advanced ignition timings up to −30 ATDC. However, the trend changed for −40 and −48 ATDC timings with a slight increase of the same. It was therefore understood that advancing the ignition timing promotes FCE, but with increased $NO_x$ emissions. The timing sweep showed that the engine of the generator 12 operates with high stability at −30 and −40 ATDC. Ignition at TDC was observed to be the worst timing with frequent engine misfire and unacceptable engine speeds. On the other end of the spectrum, ignition timing at −48 ATDC also resulted in lower FCE due to considerable drop in engine speed. This is due to the release of fuel chemical energy very early in the engine cycle during the compression stroke rather than the expansion stroke. This is also referred to as a shift from the MBT (maximum brake torque) timing which opposes the momentum of the piston and hence reduces engine speed.

Figure 6A:
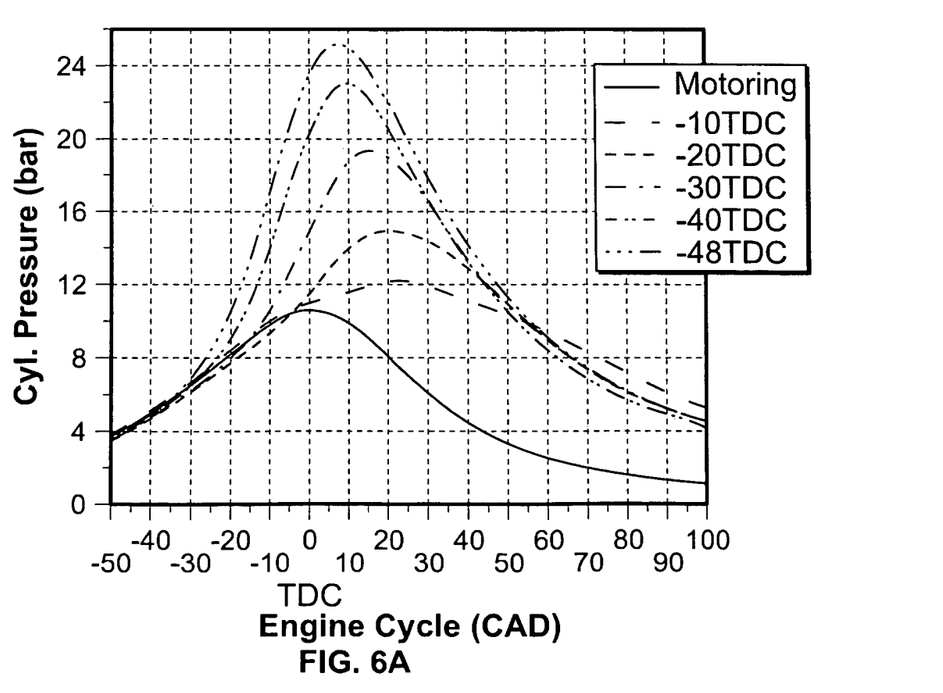
FIG. 6A illustrates cylinder pressure versus engine cycle for different ignition timing.
Figure 6B:
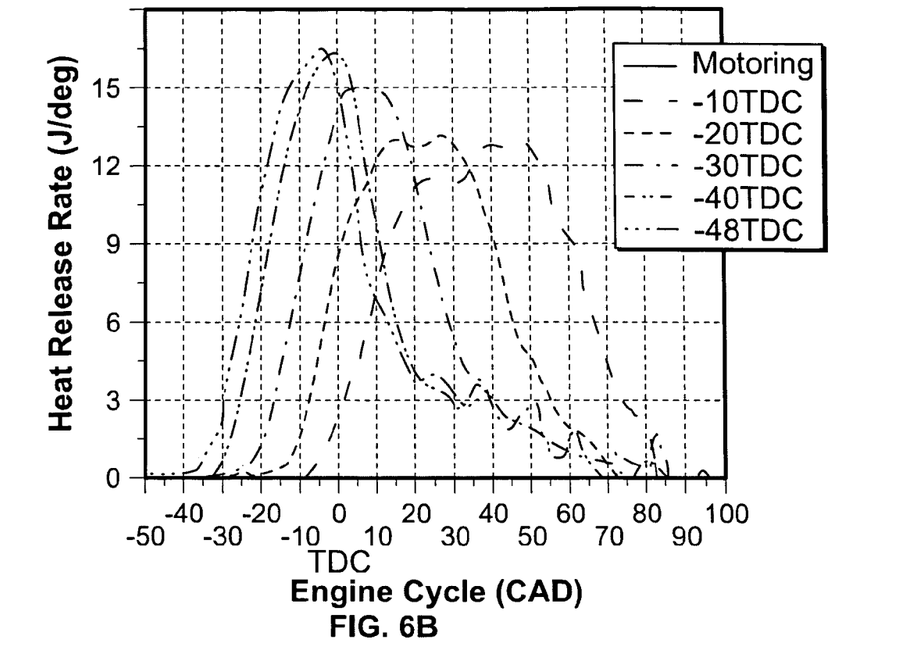
FIG. 6B illustrates heat release rate and FIG. 6C illustrates mass fraction burn.
Figure 6C:
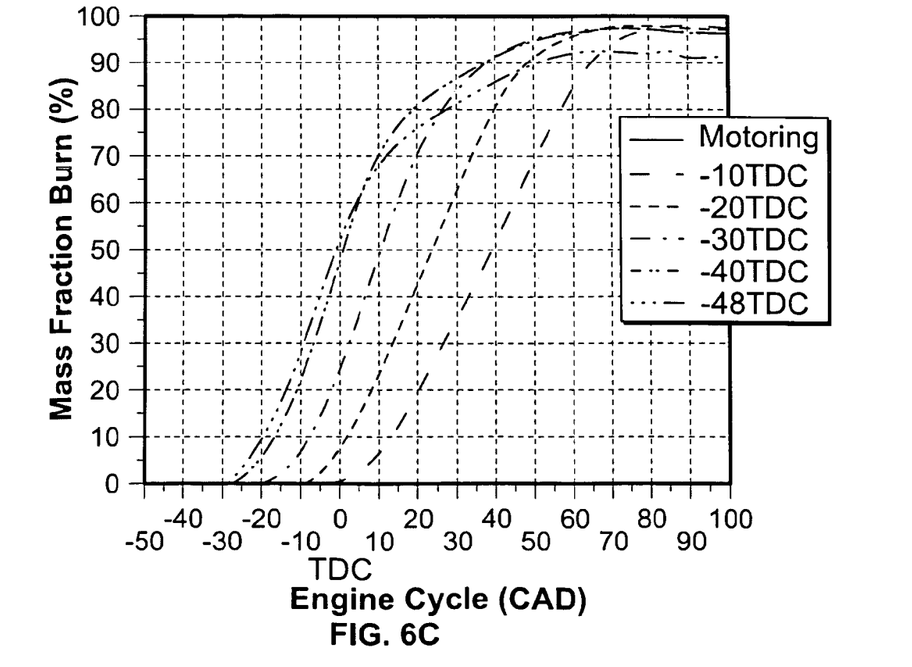

FIGS. 6A-6C show the cylinder pressure, heat release rates, and the mass fraction burn trends for different ignition timings. Cylinder pressure was averaged over 100 consecutive engine cycles for all traces. Ignition timing at TDC, as mentioned earlier, was accompanied by engine misfire and poor ignitability. However, with advanced ignition timing, the peak pressure consistently increases from 11.5 to 25 bar. It was also observed that the phasing of the peak pressure relative to TDC decreases which translates to better energy release and work transfer to the piston. The heat release rates show increased trends with advanced ignition timings which compliments the pressure analysis. It can be seen that advanced timings (−48 ATDC) have higher peak heat release rates, while the converse is true for retarded timings. Also, the combustion duration is longer for retarded timings compared to its counterpart. The combustion phasing was believed to be another important factor in understanding the combustion process in the engine. The combustion duration at TDC timing was the longest and the combustion phasing with respect to TDC was shifted more into the expansion stroke resulting in poor FCE. The peak heat release rates increased, and shifted towards TDC with advanced ignition timings. It was also observed that the combustion duration decreased with advanced timings. The shape of the heat release rates transformed into a more definite cone-shaped structure with advanced timing. However, at −48 ATDC, the peak heat release rate was drifted away from TDC towards the compression stroke. This behavior is considered to be detrimental to the production of engine power output as most of the fuel energy is released prior to the expansion stroke. This also explains the drop in FCE and engine speed. It was observed that the flame development angle for all of the traces was approximately 25 CAD based on 10% MFB. Also, the slopes of the burn rates are almost equal which suggests that the burn rates are occurring at a constant pace. However, the phasing of the burn rates with respect to TDC changes with timing sweep. This behavior explains the poor FCE and engine misfire for retarded timings. On the other hand, mass fraction burn at −48 ATDC shows a change in the slope or burn rate after 70%. This behavior was believed to be caused due to poor flame development and propagation at very advanced timings. Flame propagation and speed were compromised at these operating conditions.

The flame is initiated at the spark plug and propagates through the combustion chamber. Since this test engine was originally designed for gasoline (higher ignitability) operation, the compression ratio is not optimized for natural gas fueling condition. It was therefore believed that higher compression ratios would help counter poor engine performance at advanced ignition timings. However, this could lead to engine knock and hence a judicious choice of both ignition timing and compression ratio is appropriate.

Figure 7A:
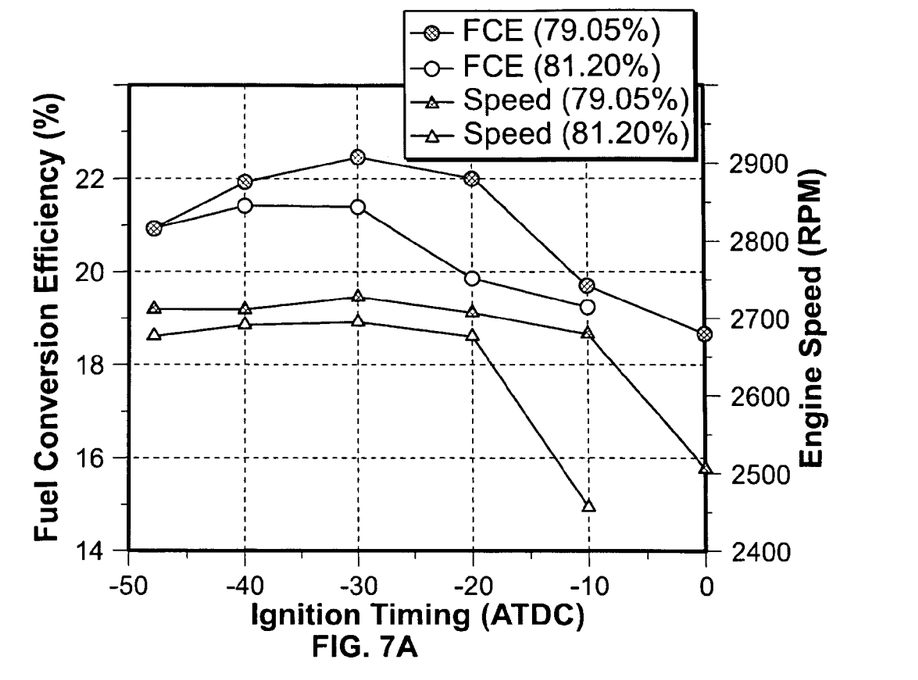
FIG. 7A illustrates effect of ignition timing and different $N_2$ enrichment on FCE and engine speed.
Figure 7B:
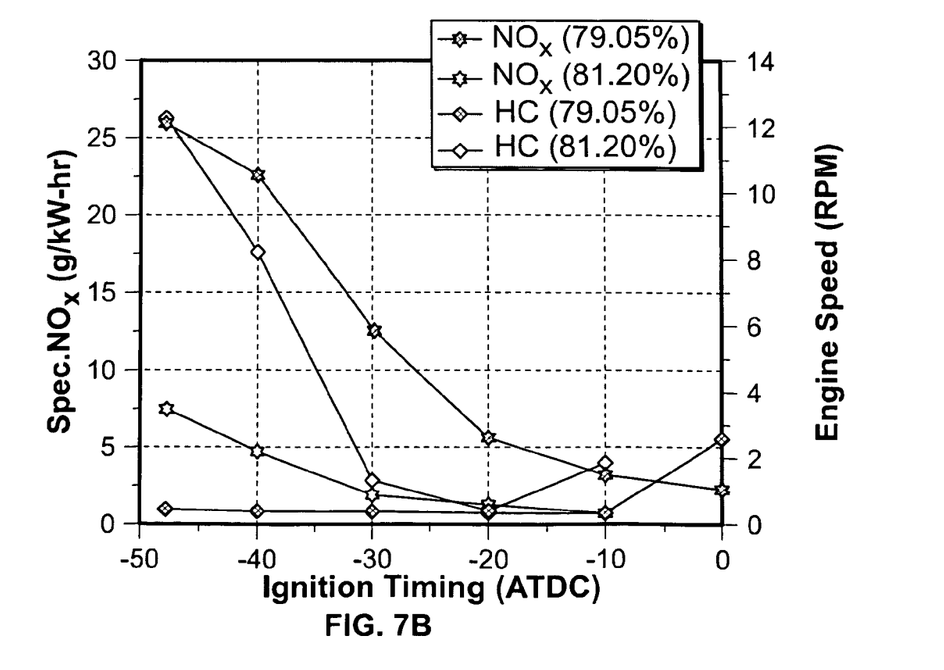
FIG. 7B illustrates effect of nitrogen enrichment on $NO_x$ and HC emissions.

FIGS. 7A and 7B show the effect of both $N_2$ enrichment and ignition timing on the performance of the engine of the generator 12. FCE increases from 18.5% at TDC IT, to 22.5% at −30 ATDC IT. However, by further advancing ignition timing, FCE drops to 21% at —48 ATDC IT. Similar FCE trend was observed with $N_2$ enrichment (81.2%), but with lower FCE values compared to no $N_2$ enrichment.

Engine speed displayed similar trends with change in ignition timing and $N_2$ enrichment. FCE was the highest (21.4%) at −30 ATDC. It was found that the rate of rise in FCE with an ignition timing change from −20 to −30 ATDC was greater with $N_2$ enrichment than normal air. This behavior promotes the importance of advanced ignition timing with $N_2$ enrichment. However, advanced ignition timings produce consistently increased $NO_x$ numbers due to higher cylinder gas temperatures as mentioned earlier. With the combination of $N_2$ enrichment and advanced ignition timings $NO_x$ emissions decrease significantly. Unburned hydrocarbons with normal air (79.05% $N_2$) were less than 0.5 g/kW·hr for most of the ignition timings except at TDC (extreme operating condition). However, with $N_2$ enrichment, it was found that advanced timings produce significantly more unburned hydrocarbons due to $O_2$ depletion and combustion inefficiency coupled with poor flame development and propagation speeds. Retarded ignition timing also resulted in higher unburned hydrocarbons due to occasional engine misfire and partial burn conditions.

The single cylinder spark ignited gasoline engine of the generator engine 12 was modified to operate with natural gas. The effect of $N_2$ enrichment and ignition timing was analyzed, and below are listed some of the advantageous results which illustrate some features of the invention. In general it was determined that $N_2$ enrichment in stoic natural gas engines is far more practical and advantageous than diesel engines due to the lower air flow rates required to achieve similar $NO_x$ reduction.

1. $NO_x$ emissions reduction close to 70% was obtained for full load (4 kW) with 2.1% $N_2$ enrichment (40 slpm) and optimal ignition timing.
2. Control of engine load is identified as an important feature in $NO_x$ reduction with $N_2$ enrichment. It was found that $NO_x$ reduction was greater for higher loads.
3. Control of ignition timing plays an important role in improving engine performance. Advancing ignition timing from TDC to −30 ATDC improved FCE by 23% approximately with no $N_2$ enrichment. However, $NO_x$ emissions increased simultaneously by 400%.
4. Advancing ignition timing from −30 ATDC to −48 ATDC decreased FCE with higher unburned hydrocarbons and increased $NO_x$ emissions.
5. Flame development and propagation was compromised at very advanced timings due to shift from MBT timing.
6. The rate of rise in $NO_x$ emissions with $N_2$ enrichment and advanced ignition timing is considerably smaller compared to the same with no $N_2$ enrichment.
7. $NO_x$ emissions can be reduced significantly with $N_2$ enrichment and the simultaneous decrease in FCE can be improved by advancing IT.

It should be understood that various changes and modifications referred to in the embodiment described herein would be apparent to those skilled in the art. Such changes and modifications can be made without departing from the spirit and scope of the present invention.

What is claimed is:

1. A method of reducing nitrous oxide emissions from an internal combustion engine, comprising:
    providing an input stream of natural gas to an engine; and
    providing an input stream of nitrogen gas to achieve substantially stoichiometric proportion to the natural gas, thereby achieving reduced nitrous oxide emissions.

2. The method as defined in claim 1 further including the step of advancing ignition timing to improve FCE while maintaining low nitrous oxide emissions.

3. The method as defined in claim 2 wherein the ignition timing is set for between −30 ATDC and −40 ATDC.

4. The method as defined in claim 1 wherein the nitrogen gas comprises about a 2% nitrogen gas enrichment or about 40 slpm for this engine configuration.

5. The method as defined in claim 4 wherein the nitrogen gas enrichment is achieved by the step of using an air separation membrane in a nitrogen gas input stream.

6. The method as defined in claim 5 wherein the air separator membrane comprises a nonporous polymeric material.

7. The method as defined in claim 1 wherein the nitrogen gas comprises about 79-82% of air input to the internal combustion engine.

8. The method as defined in claim 7 wherein the nitrogen gas comprises about 79 to 81% of air.

9. An internal combustion engine system, comprising:
   an internal combustion engine engineered to use natural gas as a fuel; and
   a source of nitrogen gas and air providing a gas mixture with the gas mixture substantially a stoichiometric mixture; and
   an input to the engine allowing the nitrogen gas and air to mix with the natural gas.

10. The internal combustion engine as defined in claim 9 wherein the nitrogen gas comprises about 2% of the air.

11. The internal combustion engine as defined in claim 9 further including advanced ignition timing for combustion of a mixture of the natural gas, the nitrogen and the air.

12. The internal combustion engine as defined in claim 11 wherein the ignition timing is about −30 ATDC to about −40 ATDC.

13. The internal combustion engine as defined in claim 9 further including an air separation membrane.

14. The internal combustion engine as defined in claim 13 wherein the air separation membrane comprises a nonporous polymeric material.

15. The internal combustion engine as defined in claim 9 wherein the nitrogen gas is about 79-81% of the air input to a combustion chamber of the engine.

16. A method of reducing nitrous oxide emissions from an internal combustion engine, comprising:
   providing an input stream of natural gas to an engine; and
   providing adjusted proportions of nitrogen gas and oxygen gas to reduce nitrous oxide emissions by at least about 70-88% compared to without nitrogen gas enrichment.

17. The method as defined in claim 16 further including the step of adjusting the proportion of nitrogen gas and oxygen gas to keep hydrocarbon emissions below about 2 g/kw·hr.

18. The method as defined in claim 16 further including the step of advancing ignition timing to improve FCE while maintaining low nitrous oxide emissions.

19. The method as defined in claim 18 wherein the ignition timing is adjusted between about −10 and −50 ATDC.

20. The method as defined in claim 19 wherein the nitrogen gas enrichment is about 2%.

* * * * *